United States Patent [19]

Harley

[11] 4,093,683
[45] June 6, 1978

[54] METHOD FOR MAKING PIPE FITTING COVERINGS

[75] Inventor: Alfred H. Harley, Greensboro, N.C.

[73] Assignee: Speed-Line Manufacturing Company, Inc., Greensboro, N.C.

[21] Appl. No.: 687,657

[22] Filed: May 19, 1976

Related U.S. Application Data

[63] Continuation-in-part of Ser. No. 311,965, Dec. 5, 1972, abandoned.

[51] Int. Cl.² .............................................. B29C 17/02
[52] U.S. Cl. ...................................... 264/25; 138/156; 264/92; 264/295; 264/322; 264/339
[58] Field of Search .................. 264/339, 25, 92, 295, 264/322; 138/156

[56] References Cited

U.S. PATENT DOCUMENTS

| | | | |
|---|---|---|---|
| 3,495,629 | 2/1970 | Botsolas | 138/149 |
| 3,499,072 | 3/1970 | Helling | 264/339 X |

FOREIGN PATENT DOCUMENTS 453,016  5/1968  Switzerland.

*Primary Examiner*—Thomas P. Pavelko
*Attorney, Agent, or Firm*—Clifton T. Hunt, Jr.

[57] ABSTRACT

A preform of a resilient thermoplastic polymeric material is first fabricated then folded into a complex tubular shape corresponding to the shape of a pipe fitting, heated while in said configuration to soften said polymeric material, and then cooled while maintained in said configuration.

20 Claims, 5 Drawing Figures

METHOD FOR MAKING PIPE FITTING COVERINGS

CROSS-REFERENCE TO OTHER APPLICATIONS

This is a continuation-in-part of application Ser. No. 311,965, filed Dec. 5, 1972, now abandoned entitled METHOD FOR MAKING PIPE FITTING COVERS.

SUMMARY OF THE INVENTION

The present invention relates in general to improved pipe fitting covers and more particularly to an improved method for making said covers.

It is desirable, and often essential, that pipe fittings such as elbows, Ts, valves, flanges, return bends, Y branches, reducing fittings, strainers, unions, and various other fittings, be provided with a suitable covering to protect them from the elements and/or surrounding contaminants. Conventionally, pipe fittings have been covered by, for example, wrapping of the pipe fitting with an adhesive tape, molding of a plastic material about the fitting, or enclosing the fitting in a metal or plastic multi-piece cover.

U.S. Pat. No. 3,495,629 to Botsolas et al., issued Feb. 17, 1970, describes an alternative technique which involves the use of a one-piece cover molded from a flexible, resilient material. The covering is formed from a sheet of resilient, thermoplastic material which has a shape conforming to the shape of the pipe fitting to be covered and overlapping portions that may be held in place by cementing.

In an alternative embodiment, Botsolas et al. teach that the covering may be preformed in a shape other than the final configuration and then bent or folded into the final configuration during installation. To illustrate the alternative embodiment, an elbow covering is described which comprises a trough having parallel side walls with semi-circular end pieces and a downwardly extending central portion. During installation, the downwardly extending central portion is fitted over the convex portion of the elbow and the end pieces are folded inwardly in overlapping position over the concave portion of the elbow.

While the one-piece cover described in the Botsolas et al. alternative embodiment, and similar commercially available covers are superior in some respects to other prior art pipe fitting covers, they have proven in practice to be difficult to hold in place while being sealed about the pipe fitting since they tend to spring back into the shape of the preform.

One-piece covers having the shape of the final configuration, as taught by the preferred embodiment of Botsolas et al., are difficult and expensive to manufacture by prior art techniques, such as that of forming of two pieces which are then cemented together or of molding in a single step process the final configuration.

It is therefore an object of the present invention to provide an improved method for making a one-piece pipe fitting cover marketed in the shape of the final configuration.

It is another object of the present invention to provide an economical method for manufacturing pipe fitting covers.

Still another object is to provide an economical method for manufacturing one-piece pipe fitting covers from a resilient, thermoplastic material in a two-stage process.

Other objects of the present invention, if not specifically set forth herein, will be obvious to the skilled artisan from a reading of the detailed description of the invention taken in conjunction with the drawings in which.

In accordance with the present invention, an improved complex tubular shaped pipe fitting cover is made by forming from resilient, thermoplastic polymeric sheet material a non-tubular preform which is so shaped that it may be folded or bent about a pipe fitting of complex tubular configuration such as an elbow to assume the desired final configuration of the cover, as described in Botsolas U.S. Pat. No. 3,495,629. Next, according to the present invention, the preform is folded into the desired final complex tubular configuration corresponding to the complex tubular configuration of the pipe fitting it is intended to cover, and the preform is heated to above the softening temperature of the thermoplastic material while the preform is maintained in the final configuration. Finally, the preform is cooled below the softening temperature of the thermoplastic material while the preform is maintained in the final complex tubular configuration.

The preform used in the present method may be prepared from a thermoplastic polymeric material by one of several conventional techniques including, but not limiting to, compression molding, injection molding, blow molding or vacuum molding. In compression or injection molding, a quantity of molten thermoplastic polymer is forced to take the configuration of a mold cavity conforming to the shape of the preform. In blow molding or vacuum molding, a softened sheet of thermoplastic polymer is blown or drawn against a surface having the shape of the preform.

In describing the invention in greater detail, specific reference will be made to the method for making elbow joint and T-joint covers, although it is to be realized that the description of these particular covers is intended only as illustrative of the invention, the manufacture of other covers in accordance with the present method being obvious to one skilled in the art from an understanding of the method for making an elbow joint cover or T-joint cover.

Figure 1:
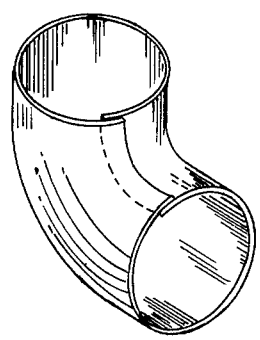
FIG. 1 is a perspective view illustrating an elbow joint cover made in accordance with the present invention.
Figure 2:
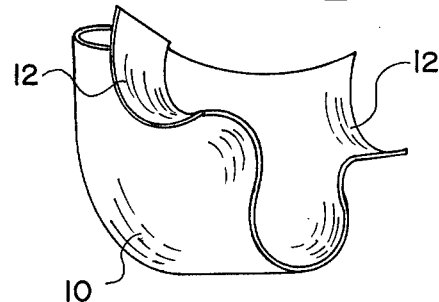
FIGS. 2 and 3 are perspective views illustrating preforms useful in making the elbow cover shown in FIG. 1.

Elbow joint covers of the type illustrated in FIG. 1, are preferably formed by first fabricating from a sheet of resilient thermoplastic polymeric material a complex non-tubular preform having the configuration shown in FIG. 2, which preform comprises a central domed portion 10 having a pair of integral flaps 12 spaced opposite each other across domed portion 10 and extending outwardly from the side walls thereof. Flaps 12 preferably have a semi-elliptical cross-section and are substantially axially aligned. The profile of domed portion 10 along a direction transverse to the axis of alignment of flaps 12 preferably approximates that of the elbow joint to be covered.

Figure 3:
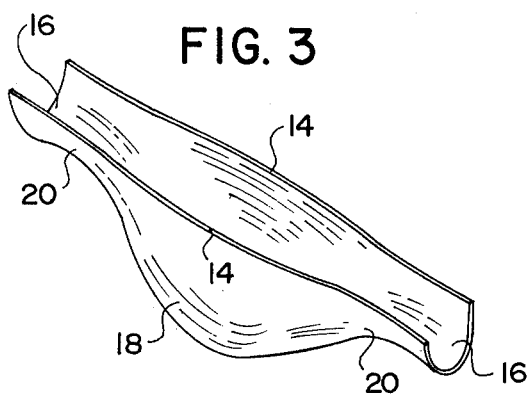

A complex non-tubular preform of the type shown in FIG. 3 and illustrated at FIG. 6 in U.S. Pat. No. 3,495,629 may also be used to form a complex tubular elbow joint cover before being positioned about an elbow pipe coupling. This preform is formed from a resilient sheet of thermoplastic material shaped into an elongated trough having generally straight, longitudinal edges 14 and ends 16 which are open-ended and preferably approximate a semi-circular or parabolic section. Centrally located in the trough is a central domed portion 18 which is expanded outwardly in a direction away from the longitudinal edges 14. Domed portion 18 is preferably expanded so as to have a sinusoidal profile. Between domed portion 18 and ends 16 are flaps 20 which are subsequently folded toward each other over domed portion 18. Flaps 20 correspond to flaps 12 of the previously described preferred preform.

Figure 4:
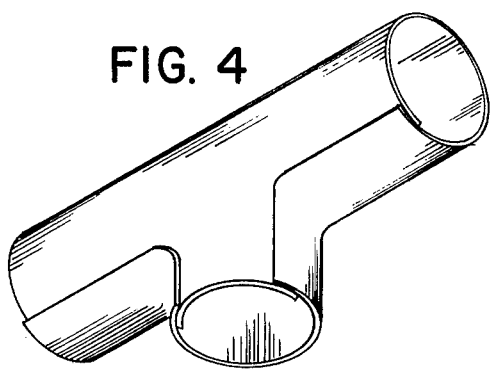
FIG. 4 illustrates a T cover made in accordance with the present invention.
Figure 5:
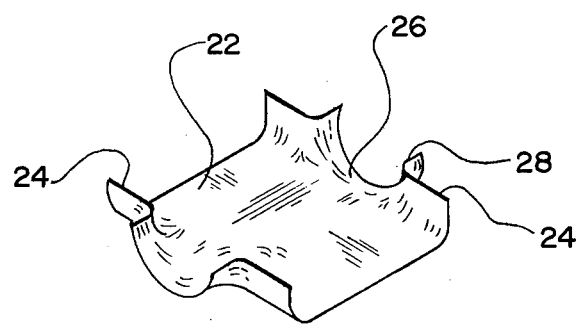
FIG. 5 illustrates a preform useful in making the T cover shown in FIG. 4.

To form a T-joint cover as illustrated in FIG. 4, a preform of the type shown in FIG. 5 may be employed. This preform comprises an arcuate-shaped first trough 22 having parallel side edges 24. The arc of trough 22 extends at least 180° and preferably slightly greater than 180° to provide an overlapping hem or marginal portion in the final configuration. The cross-sectional radius is at least equal to twice the radius of the pipe forming the crossbar of the T to be covered.

Transecting first trough 22 at approximately its central portion is a second trough 26 having parallel side edges 28 adjoining and intersecting side edges 24 of first trough 22. Second trough 26 also has an arcuate cross-section of at least 180°. The cross-sectional radius of second trough 26 is at least equal to the radius of the upright of the T to be covered, and preferably is slightly greater.

In practicing the present method, one of the preforms fabricated according to the first stage of the process described above is then folded, preferably about a suitable support surface such as a mandrel or the like, corresponding in shape to the fitting or coupling to be covered, or in a correspondingly shaped mold, with the flaps being turned inwardly into contact with each other, and preferably into overlapping position. The preform is then clamped or otherwise held in place for the heating step as described hereinafter.

The preform is then heated to such a temperature to soften the thermoplastic material sufficiently to relieve the stresses therein and reform the preform while the preform is maintained in the complex tubular configuration. Heating may be by way of radiant heat, immersion of the preform into a heated water bath, heating of the support piece, or the like. The actual heating conditions will vary depending upon the polymeric material used and the thickness of the preform. For example, a polyvinyl chloride preform having a thickness of 15-30 mils is preferably heated to a temperature of 175°-200° F. for at least 12-15 seconds.

After heating, the preform is maintained in its complex tubular configuration while cooling it to below the softening temperature of the polymer, and preferably to room temperature. An external cooling medium such as a cooling air or liquid may be applied in order to more rapidly reduce the temperature.

After the thermoplastic material has been cooled to at least below the softening temperature of the polymer, it is to be observed that the complex non-tubular preform has been transformed to a cover which will retain the final configuration corresponding to the complex tubular fitting or coupling with which it is to be used and, if the flaps are spread apart and then released, the cover will immediately return to that final configuration.

The preform can be made from a variety of thermoplastic, polymeric materials including, but not limited to vinyl resins, eg, polyvinyl chloride; polypropylene; polyethylene; acrylics; cellulose ethers and esters; and polyamides.

Normally, the preform and resultant covering, will preferably have a maximum thickness of from about 15 to 30 mils.

If desired, the insulating properties of the pipe fitting covering may be enhanced by positioning an insulation material inside the preform and folding the preform over the insulation. The insulation may be permanently adhered to the inside of the pipe fitting cover by coating the insulation or interior of the preform with an adhesive prior to positioning of the insulating material.

In utilizing the covers prepared in accordance with the present invention, the side flaps are pulled apart and the cover is slipped over the pipe fitting. The flaps are then released, whereupon the cover takes on the final configuration. The side flaps are then adhered to each other by way of, for example, a suitable adhesive, sealing tape, or by heat sealing.

It is to be understood that many modifications and variations of the present invention may be made without departing from the spirit and scope thereof.

I claim:

1. A method of forming a cover for a pipe fitting having a complex configuration in the same complex configuration as the pipe fitting to be covered, said cover including an opening extending between the ends of the cover whereby the cover may be spread apart and placed in position surrounding the pipe fitting, said method comprising the steps of:
    (a) forming a single piece of thermoplastic material into a preform having an intermediate non-planar configuration different from the complex configuration of the fitting to be covered,
    (b) folding the preform into the final complex configuration of the fitting to be covered,
    (c) heating the said material while retaining it in its final complex configuration, and
    (d) cooling the said material to set it in its final complex configuration while retaining the said material in its said final complex configuration.

2. The method of forming a cover for a pipe fitting according to claim 1 wherein said preform is in the shape of an elongated open-ended trough having generally straight longitudinal edges, said trough having a central domed portion extended outwardly in a direction away from said longitudinal edges.

3. The method of claim 2 wherein said trough has ends of a semi-circular or parabolic configuration.

4. The method of claim 2 wherein the outwardly extended central domed portion has a sinusoidal profile.

5. A method for conforming a cover for a pipe fitting according to claim 1 wherein the intermediate configuration of the preform includes a central domed portion having a pair of integral flaps spaced opposite each other across the domed portion and extending outwardly from the domed portion, and said method includes the folding of the flaps toward each other and into overlapping relation opposite the domed portion.

6. A method according to claim 1 wherein step (d) is carried out by using radiant heat.

7. A method according to claim 1 wherein the preform is folded from its intermediate configuration to its final configuration about a mandrel conforming to the configuration of the fitting to be covered.

8. A method according to claim 7 wherein the mandrel is heated above the softening temperature of the thermoplastic material.

9. The method of claim 1 wherein said thermoplastic polymeric material is selected from the group consisting of the vinyl resins polypropylene, polyethylene, acrylics, cellulose ethers and esters, and polyamides.

10. A method of making a pipe fitting cover from thermoplastic polymeric material as a single piece integral structure having a complex shape conforming to the configuration of the fitting to be covered, said pipe fitting cover including an opening extending between the ends of the pipe fitting cover whereby the pipe fitting cover may be spread apart and placed in position surrounding the pipe fitting, said method comprising the steps of:
 (a) providing a sheet of thermoplastic polymeric material,
 (b) forming said sheet of material into a preform having an intermediate configuration different from the configuration of the fitting to be covered,
 (c) folding the preform from its intermediate configuration to its final configuration conforming to the configuration of the fitting to be covered,
 (d) heating the preform above the softening temperature of the thermoplastic material while retaining the preform in its final configuration, and
 (e) cooling the preform below the softening temperature of the thermoplastic material while retaining the preform in its final configuration to set it in the configuration of the fitting to be covered.

11. A method of making a pipe fitting cover according to claim 10 wherein the intermediate configuration of the preform comprises a central domed portion having a pair of integral flaps spaced opposite each other across said domed portion and extending outwardly in opposite directions from the domed portion.

12. The method of claim 11 wherein said flaps are semi-elliptical in cross-section and are substantially axially aligned.

13. The method of claim 12 wherein the profile of said domed portion along a direction transverse to the axis of alignment of the flaps approximates that of the pipe fitting to be covered.

14. A method according to claim 10 wherein the thermoplastic polymeric material is polyvinylchloride having a thickness of 15–30 mils.

15. A method according to claim 14 wherein step (d) is carried out by heating the preform to a temperature of 175°–200° F.

16. A method according to claim 15 wherein the preform is maintained at a temperature of 175°–200° F for at least 12–15 seconds.

17. A method according to claim 10 wherein step (e) is carried out with a cooling medium to rapidly reduce the temperature below the softening temperature of the thermoplastic material.

18. A method according to claim 10 wherein step (d) is carried out by immersing the preform into a water bath heated above the softening temperature of the thermoplastic material.

19. A method according to claim 10 wherein the preform comprises an arcuate shaped first trough having parallel side edges, the arc of said first trough extending at least 180°, a second trough transecting said first trough at approximately its central portion, the second trough having parallel side edges adjoining and intersecting side edges of the first trough, the arc of the second trough also extending at least 180°.

20. The method of claim 10 wherein there is provided a mandrel having the complex configuration of the fitting to be covered, and wherein the material in its intermediate non-planar configuration is positioned about the mandrel and the configuration of the material is changed from its intermediate non-planar configuration to the final complex configuration of the mandrel and the fitting to be covered and the material is retained on the mandrel during the heating and cooling steps.

* * * * *